Patented Aug. 27, 1929.

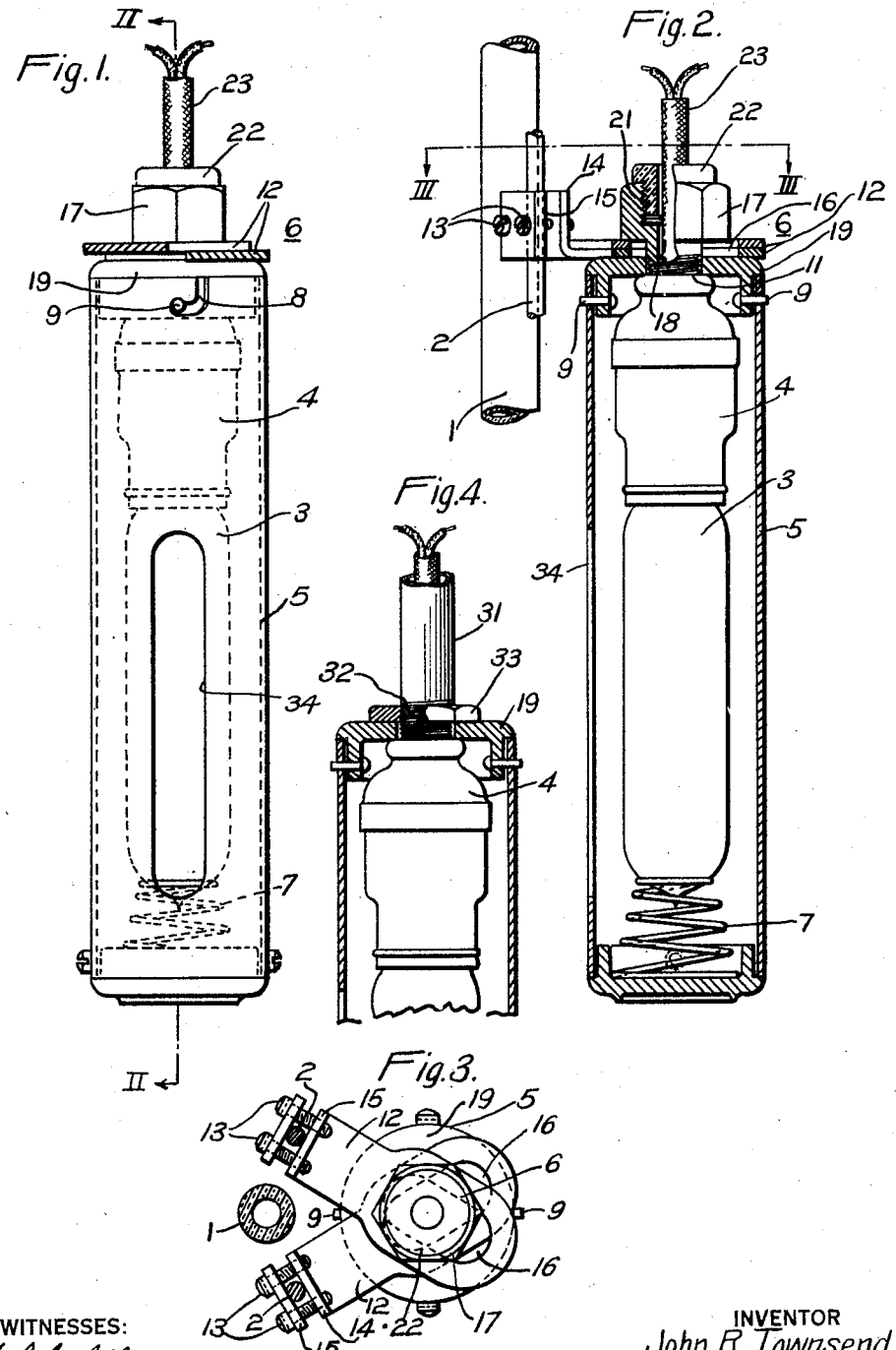

1,726,168

UNITED STATES PATENT OFFICE.

JOHN R. TOWNSEND, OF SOUTH BEND, INDIANA, ASSIGNOR TO WESTINGHOUSE ELECTRIC & MANUFACTURING COMPANY, A CORPORATION OF PENNSYLVANIA.

BOILER-GAUGE ILLUMINATOR.

Application filed September 26, 1925. Serial No. 58,809.

My invention relates to electric illuminating devices and particularly to illuminators for boiler gauges.

One object of my invention is to provide a boiler gauge illuminator that shall be adapted for application to boiler gauges now in the field without the necessity of modifying the boiler gauges in any manner whatsoever.

Another object of my invention is to provide an illuminator for boiler gauges that shall utilize the conventional guard rods common to boiler gauges for its support.

It is also an object of my invention to provide an illuminator for boiler gauges that shall be capable of adjustment relative to the boiler gauges.

A further object of my invention is to provide an illuminator for boiler gauges that shall be supported upon brackets by clamping means that cooperate with the ordinary opening in the base of an electric lamp socket.

In illuminating gauges in which the level of a column of liquid is constantly varying, such as boiler gauges, it is customary practice to protect the glass tube through which the level is observed by guard rods placed at either side and slightly in front thereof. These guard rods are usually in the form of metal rods that are capable of supporting small weight and also of resisting certain bending moments. Such guard rods are standard on nearly all boiler gauge installations now in service.

In accordance with my invention, I propose to utilize the guard rods for supporting an illuminator for the gauge in such manner that the illuminator may be shifted relatively to the gauge and at the same time avoid the necessity of utilizing elaborate supporting or clamping means.

In the accompanying drawings,

Fig. 1 is an elevational view of an illuminator for boiler gauges and the like, embodying my invention, Fig. 2 is a view, partially in elevation and partially in section taken along the section line II—II of Fig. 1, and Fig. 3 is a plan view partially in section taken along the section line III—III of Fig. 2, the electric conductor being omitted.

Fig. 4 is a fragmentary view, partially in elevation and partially in section, of a modified form of my invention.

My invention comprises in general, a boiler gauge tube 1 having the usual guard rods 2 extending in parallel relation thereto, together with an electric light 3, the base 4 of which supports a reflector 5 that is clamped to the guard rods 2 by a clamping device 6 hereinafter more fully described.

The electric lamp 3 is preferably of elongated form, usually termed a "bung-hole" lamp, and is supported at its free end by a coil spring 7 to oppose relative movement between the lamp and the reflector 5. The reflector 5 is provided with bayonet slots 8 for cooperation with pins 9 mounted on the clamping device 6 and is provided also with an elongated slot 34 which is disposed in parallel relation to the water gauge for illuminating it. The lamp socket 4 is preferably of the keyless type in common use in house lighting, and is provided at one end with a threaded opening 11 for engagement with a conduit or a hard rubber bushing.

The clamping device 6 comprises a pair of brackets 12, one of which is secured to each of the guard rods 2 by clamping bolts 13 that extend between an upturned edge 14 of the bracket and a plate 15. Each of the brackets 12 is provided near its inner end with an elongated opening 16.

A clamping nut 17 that is provided with a threaded extension 18 extends through the superimposed openings 16 and a supporting member 19 for the pins 9 into engagement with the threaded opening 11 in the lamp socket 4.

The outer end of the clamping nut 17 is provided with a threaded seat 21 into which may be threaded a hard-rubber bushing 22 or the end of a conduit as desired. The electrical conductor 23 passes through the bushing 22 and the nut 17 and is electrically connected to the lamp socket 4 in a customary manner.

While I have shown the lamp 5 suspended from the brackets 12, it may be placed above, and rest upon, the brackets 12 if desired, without altering the relative number or disposition of the component parts of my invention.

In assembling the illuminator embodying my invention, the brackets 12 are first secured to the guard rods 2 by means of the clamping screws 13. The relative height of the illuminator is fixed by the position of the brackets on the guard rods 2 and the angular relation between the brackets 12 is so chosen as to dispose the reflector 5 at the desired distance from the gauge tube 1. This position is determined by the position of the axis of the overlapping portions of the openings 16. The nut 17 is then passed over the electric conductor 23 and inserted into the superposed portions of the openings 16. The supporting member 19 and the lamp socket 4 are then brought into engagement with the nut 17 and the latter is screwed into the threaded opening 11 into the lamp socket 4, which operation completes the assemblage of the illuminator.

Referring particularly to Fig. 4, I have shown an arrangement for mounting the lamp base 4 and supporting member 19 directly on the end of a conduit pipe 31 having threads 32. The threads 32 engage the lamp base 4 after the supporting member 19 has passed over the end thereof. A threaded washer 33 is then screwed down upon the supporting member 19, thereby clamping it firmly against the base 4. This form of my invention is particularly adapted for use where a conduit pipe is available for supporting the illuminating device in lieu of the guard rods 2 shown in the other form of my invention.

It will thus be seen that I have devised an illuminator for water gauges and the like that is simple in construction and that utilizes the guard rods common to such boiler gauges for its support. The illuminator may also be connected to a supply circuit by an ordinary flexible cable or by conduit connections as desired since the same clamping means is adapted for connections to either type of wiring.

While I have described and illustrated but one embodiment of my invention, it will be apparent to those skilled in the art that various changes, modifications, substitutions, additions and omissions may be made in the apparatus described without departing from the spirit and scope of the invention as set forth by the appended claims.

I claim as my invention:—

1. The combination with a lamp socket having a threaded opening therein, a member to be observed and a pair of rods extending in parallel relation to the observed member, of means for supporting the lamp socket comprising a bracket adjustably secured to each of the rods, each bracket having an elongated opening near the free end thereof, and a threaded nut extending through the openings and into engagement with the threads in the lamp socket, whereby the position of the lamp socket may be adjusted about the observed member.

2. The combination with a reflecting lamp having a threaded opening in its base, a gauge tube, and a pair of guard rods, of means for supporting the lamp comprising a bracket adjustably secured to each of the rods, each bracket having an elongated opening near the free end thereof, and a threaded nut extending through the openings and into engagement with the threads in the lamp.

3. The combination with a lamp socket, a member to be observed and a pair of rods extending in parallel relation to the observed member, of means for supporting the lamp socket comprising a bracket adjustably secured to each of the rods, each bracket having an elongated opening near the free end thereof, and clamping means extending through the openings and co-operating with the lamp socket, whereby the position of the lamp socket may be adjusted about the observed member.

4. In combination with a lighting fixture for water gauges comprising a base member having a threaded opening therein, a lamp mounted on said base member, a reflector having an elongated slot mounted on the base member, said elongated slot being disposed in parallel relation to the water gauge for illuminating it, a means for supporting the base member comprising a bracket secured to the guard rod of the gauge and having an opening near one end thereof and a threaded nut extending through the last named opening for engaging with the threads in the base member.

5. In combination with a lighting fixture for water gauges comprising a base member having a threaded opening therein, a lamp mounted on said base member, a reflector having an elongated slot mounted on the base member, said elongated slot being disposed in parallel relation to the water gauge for illuminating it, means for supporting the base member comprising a bracket secured to each of the guard rods of the gauge, each bracket having an opening near one end thereof and a threaded nut extending through the openings and into engagement with the threads in the base member.

6. In combination with a lighting fixture for water gauges comprising a base member having a threaded opening therein, a lamp mounted on said base member, a reflector having an elongated slot mounted on the base member, said elongated slot being disposed in parallel relation to the water gauge for illuminating it, a means for supporting the base member comprising a bracket secured to each of the guard rods of the gauge bracket having an elongated opening near one end thereof and a threaded nut extending through the openings and into engagement with the threads in the base member whereby the position of the base member may be adjusted about the gauge.

7. In combination with a lighting fixture for water gauges comprising a base member having a threaded opening therein, a lamp mounted on said base member, a reflector having an elongated slot mounted on the base member, said elongated slot being disposed in parallel relation to the water gauge for illuminating it, a means for supporting the base member comprising a bracket secured to a guard rod of the gauge and having an opening near one end thereof and clamping means extending through the last named opening and cooperating with the base member.

In testimony whereof, I have hereunto subscribed my name this 24th day of August, 1925.

JOHN R. TOWNSEND.